Oct. 23, 1934.　　　　M. J. BERLYN　　　　1,977,961
MOTOR DRIVEN POWER UNIT FOR VALVES AND THE LIKE
Filed May 18, 1932　　　4 Sheets-Sheet 1
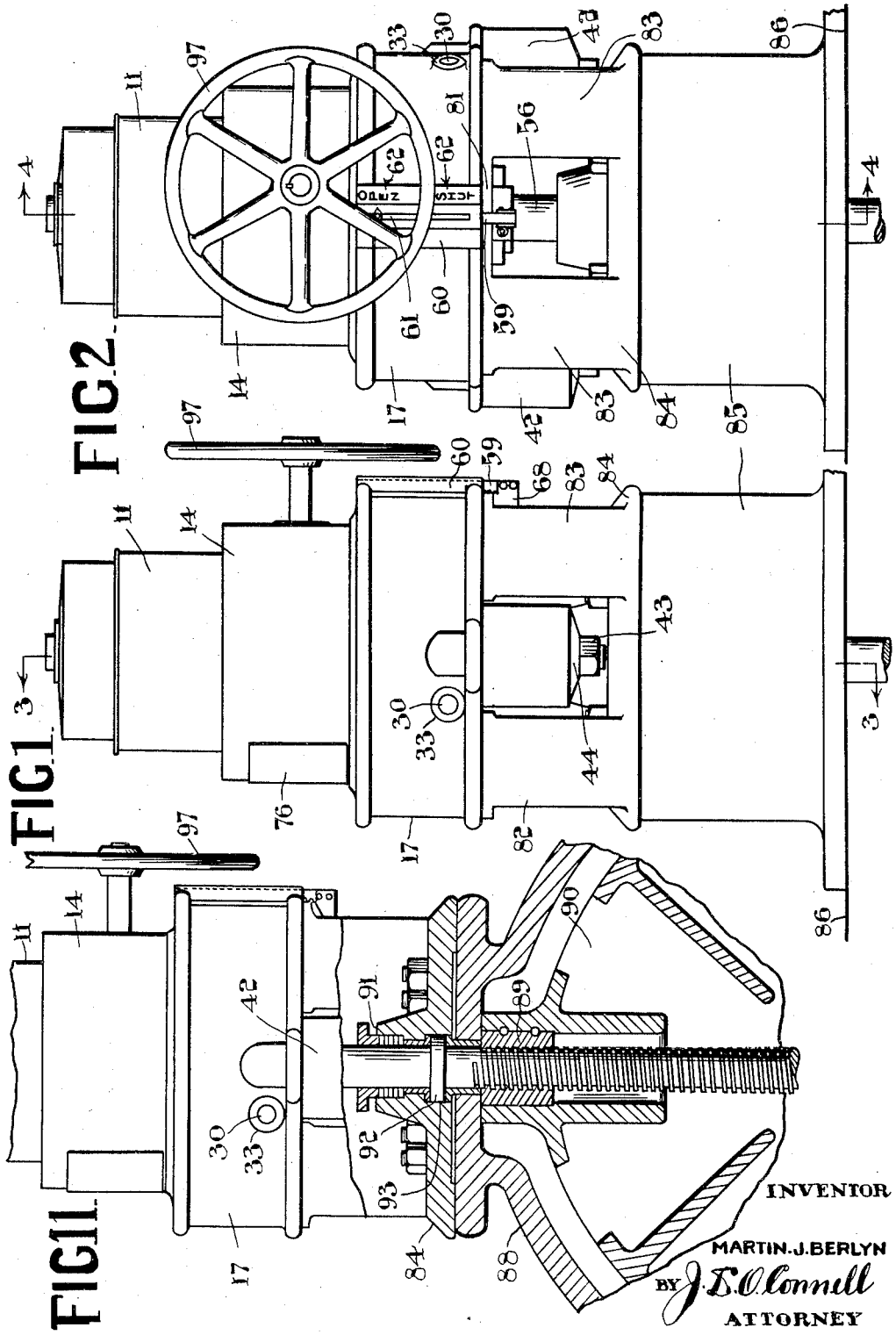

Oct. 23, 1934.   M. J. BERLYN   1,977,961
MOTOR DRIVEN POWER UNIT FOR VALVES AND THE LIKE
Filed May 18, 1932   4 Sheets-Sheet 2
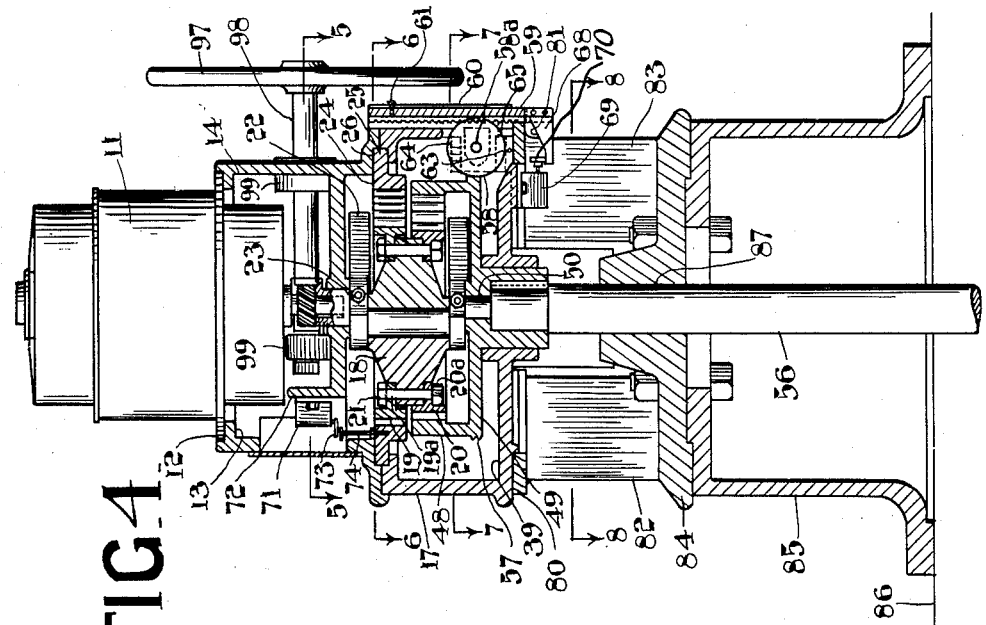
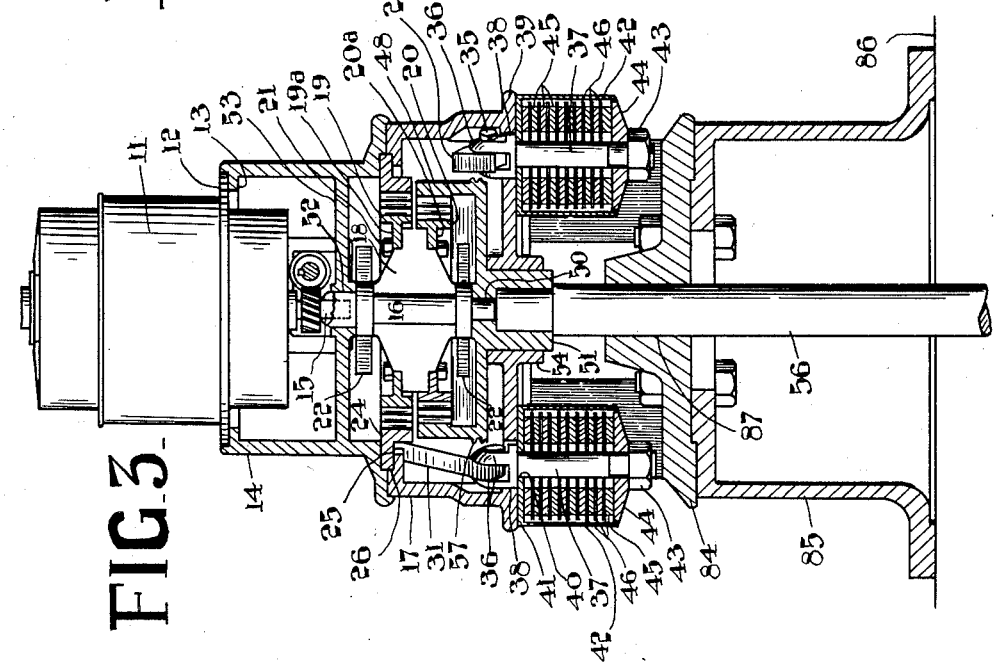
INVENTOR
MARTIN J. BERLYN
BY J. L. O'Connell
ATTORNEY Oct. 23, 1934.　　　M. J. BERLYN　　　1,977,961
MOTOR DRIVEN POWER UNIT FOR VALVES AND THE LIKE
Filed May 18, 1932　　　4 Sheets-Sheet 3
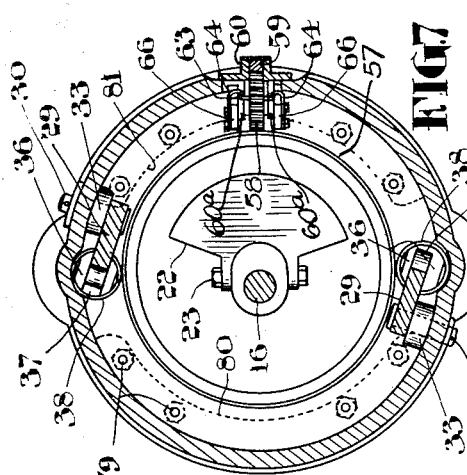
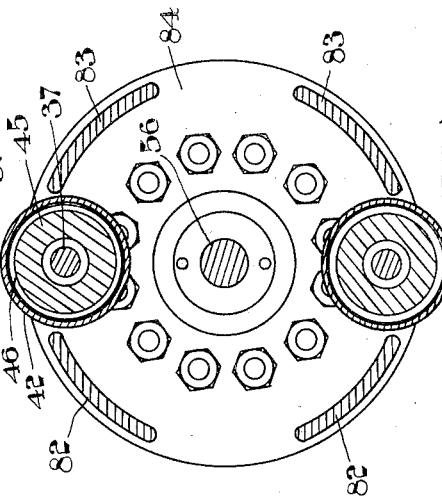
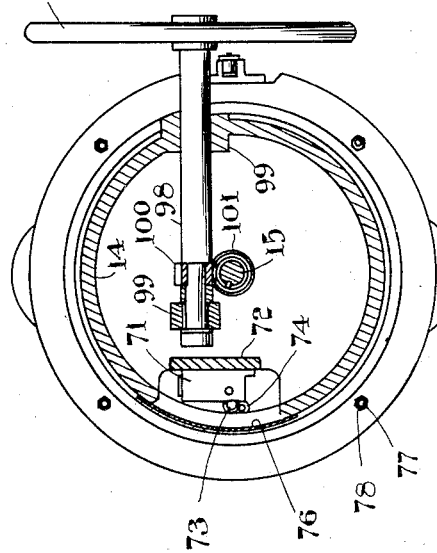
INVENTOR
MARTIN J. BERLYN
BY J. D. O'Connell
ATTORNEY Patented Oct. 23, 1934

1,977,961

UNITED STATES PATENT OFFICE 1,977,961

MOTOR DRIVEN POWER UNIT FOR VALVES AND THE LIKE

Martin J. Berlyn, Montreal, Quebec, Canada, assignor to Dominion Engineering Works Limited, Lachine, Quebec, Canada Application May 18, 1932, Serial No. 612,146

17 Claims. (Cl. 172—239)

This invention relates to motor driven power units for operating valves and other devices.

One object of the invention is to provide novel means for opening the motor circuit and bringing the moving parts to rest without shock whenever the valve or other driven element reaches the limit of its intended movement or encounters an arresting obstruction which causes the torque on the motor shaft to rise above a predetermined maximum value.

Another object is to provide a novel form of reduction gearing between the driving shaft and the valve or other driven element, said reduction gearing being of the epicyclic type and designed to reduce the power consumption and to provide for an unusually high ratio of gear reduction between the driving shaft and the driven element.

A further object is to arrange the component elements of the power unit in a simple and compact manner so that the unit presents a symmetrical appearance; occupies a minimum amount of space when applied to the spindle of a valve or other driven element and may be readily assembled or dismantled.

Other objects and advantages of the invention will be apparent from the following detailed description and accompanying drawings, wherein Figure 1 is a view in side elevation of a valve operating mechanism constructed in accordance with this invention.

Figure 2 is a side elevation of the valve mechanism taken at right angles to Fig. 1.

Figure 3 is a vertical sectional view taken along the line 3—3 of Fig. 1.

Figure 4 is a vertical sectional view taken along the line 4—4 of Fig. 2.

Figure 5 is a transverse sectional view along the line 5—5 of Fig. 4.

Figure 6 is a transverse sectional view along the line 6—6 of Fig. 4.

Figure 7 is a transverse sectional view along the line 7—7 of Fig. 4.

Figure 8 is a transverse sectional view along the line 8—8 of Fig. 4.

Figure 9 is a detail vertical sectional view taken along the line 9—9 of Fig. 6.

Figure 10 is a fragmentary detail view.

Figure 11 is a view partly in section and partly in elevation of the operating mechanism as applied directly to a gate valve.

Figure 12:
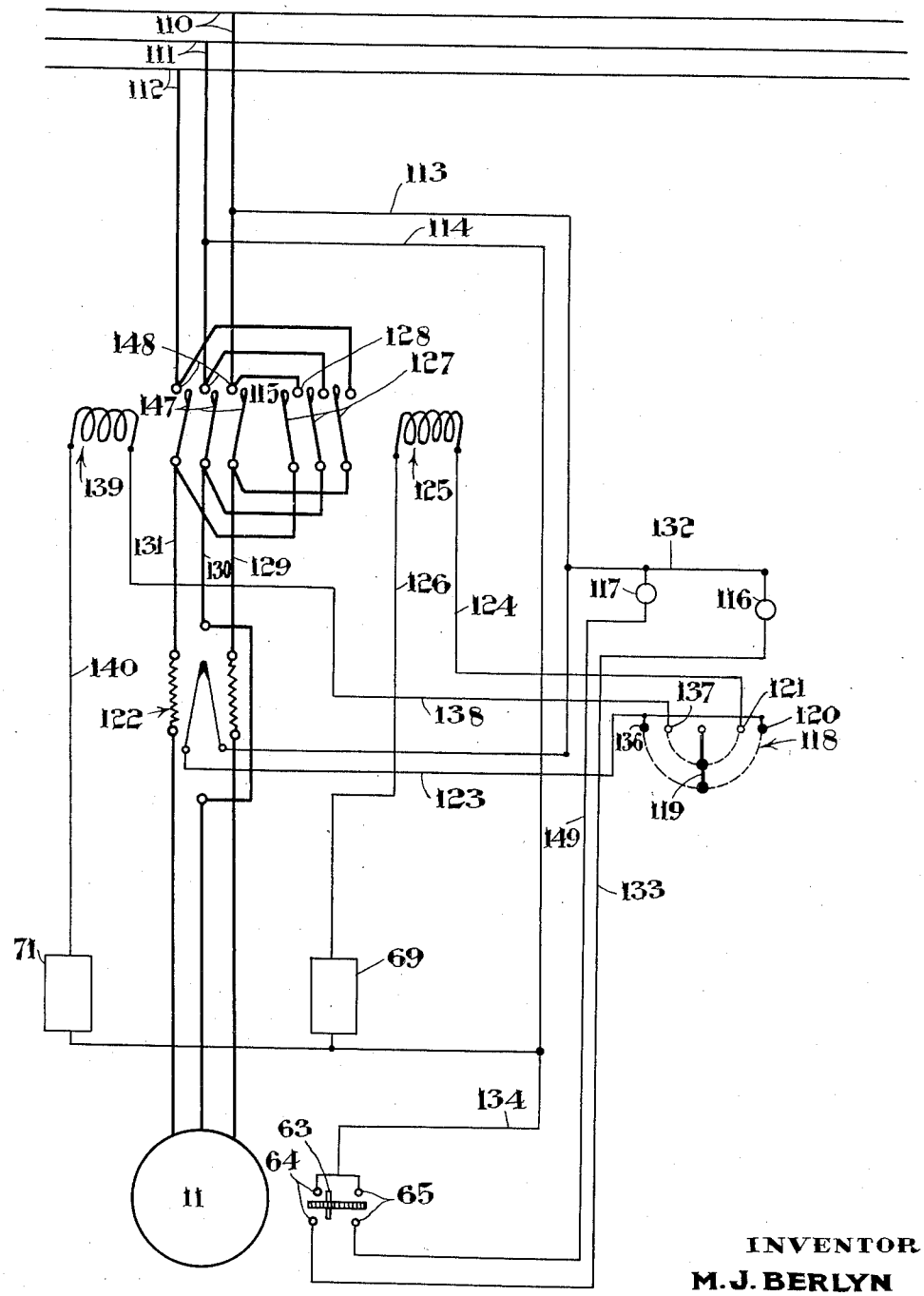
Figure 12 is a wiring diagram showing one method of connecting up the various electrical control and signalling devices contemplated by the present invention.

Referring more particularly to the drawings, 11 designates a motor equipped with a flange 12 resting on a supporting ledge 13 at the upper end of a casing 14. The motor shaft 15, hereafter referred to as the driving shaft, is directly coupled to the upper end of a vertical crank shaft 16 arranged in a casing 17 supporting the casing 14. A split block 18 is detachably fixed to the crank shaft 16 and carries upper and lower pinions 19 and 20, said pinions being secured in place by bolts 21 passing through the block 18 and through the pinion flanges 19a and 20a. The crank shaft 16 also carries a pair of balancing counterweights 22 positioned above and below the block 18, said counterweights being detachably fixed to the shaft by bolts 23 as shown to advantage in Figure 6.

The pinion 19 is of slightly greater diameter than the pinion 20 and meshes with an internally toothed ring gear 24, said gear 24 having an outwardly directed flange 25 supported to rotate in an annular recess 26 provided at the joint between the casings 14 and 17. Rotation of the gear 24 in one direction is limited by a pin 27 (see Figs. 6 and 9) passing through a slot 28 in the flange 25 and having its ends fixed in suitable openings formed in contacting portions of the casings 14 and 17. Rotation of the gear 24 in the reverse direction is restrained by a plurality of bell crank levers 29, each of which is pivoted on a pin 30 which passes through the lever at the juncture of the lever arms 31 and 32 and is fixed in a boss 33 integral with the annular wall of casing 17. The upwardly projecting arm 31 of each lever 29 engages in a slot 34 formed in the flange 25 of the gear 24. The remaining lever arm 32 is secured by a pivot pin 35 to the jaws 36 of a jaw bolt 37. The bolt 37 passes through an opening 38 in the bottom wall 39 of the casing 17 and through a registering opening 40 in the top wall 41 of an inverted cup-shaped spring casing 42. The lower end of bolt 37 is equipped with a nut 43 supporting a plate 44 which substantially closes the lower end of the casing 42 and is vertically movable therein. A plurality of rubber disks 45, separated by thin metal spacers 46, are interposed between the plate 44 and the top wall of the casing 42 to yieldingly resist upward movement of the bolt 37.

The pinion 20 meshes with a lower internally toothed ring gear 48 concentric with but of slightly smaller diameter than the ring gear 24. Ring gear 48 is cast integral with or fixed to the periphery of a plate 49 having a bearing opening 50 and a depending hub 51. The bearing opening 50 receives the lower end of the crank shaft 16, the upper end of which is fitted in a bearing opening 52 in the bottom wall 53 of the casing 14. The hub 51 rotates in a bearing 54 in the bottom wall 39 of the casing 17 and is directly coupled to a driven shaft 56 which, in the present instance, is assumed to represent a valve operating shaft or spindle. It will be obvious, however, that shaft 56 may be used for transmitting motion to any device capable of being operated and controlled in accordance with the present invention.

The ring gear 48 is formed with a peripheral screw thread 57 in driving engagement with a pinion 58 which serves to raise or lower an indicating rack 59 depending upon the direction of rotation imparted to the gear 48 and the pinion 58. The rack 59 operates in a guide housing 60 and is provided with a pointer 61 cooperating with suitable markings 62 to indicate the position of the valve carried at the lower end of the stem 56. The pinion 58 carried an insulated pin 63 (see Fig. 7) adapted to bridge the gap between a pair of contacts 64 to close the circuit of a signal lamp hereinafter referred to when the valve at the lower end of the stem 56 is nearly closed. When the valve is near the limit of its opening movement the pin 63 is positioned to bridge a similar pair of contacts 65 forming part of a normally open circuit including a second signal lamp. The two sets of contacts 64 and 65 are attached to insulating blocks 66 mounted at opposite sides of the pinion 58. These blocks 66 are fastened to lugs 60a which project inwardly from the rack guide 60 and carry a pin 58a on which the pinion 58 is mounted. The rack 59 carries a trip arm 68 adapted, at a certain point in the upward movement of the rack, to operate a limit switch 69 by engagement with the switch control trigger 70, said switch 69 being conveniently secured to the bottom wall 39 of the casing 17.

A second limit switch 71 is fastened to a lug 72 within the casing 14 and is provided with a control trigger 73 adapted to be engaged at times by a trip member 74 projecting upwardly from the ring gear 24.

The casing 14 is provided with an inspection door 76 and is secured on the casing 17 by a suitable number of studs 77 and nuts 78. Casing 17 is fastened by bolts 79 to a pair of supporting flanges 80 and 81 integral with the upper ends of spaced pillars 82 and 83 rising from a base 84.

In Figures 1 to 4 inclusive the base 84 is shown bolted to the upper end of a pedestal 85 resting on the floor surface 86. In this case the driven shaft 56 extends downwardly through a bearing 87 in the base 84 and through the pedestal 85 to the valve casing (not shown) which is located on the floor below or at some other lower level and contains any suitable form of valve (not shown) attached to the lower end of the shaft 56. In Fig. 11 the base 84 is shown bolted directly to the top of the valve casing 88 and the driven shaft 56 is shown in threaded engagement with the nut portion 89 of the vertically movable valve disk 90. In this latter instance the shaft 56 passes through a stuffing box 91 carried by the base 84 and is held against vertical movement by a thrust collar 92 confined in a recess 93.

In describing the operation it will be assumed that the various parts are in the positions occupied when the valve disk is at the limit of its opening movement. To close the valve the motor 11 is energized to rotate the drive shaft 15 and the crank shaft 16 in a counter-clockwise direction. Due to the difference in the diameters of the travelling pinions 19 and 20 and their cooperating ring gears 24 and 48 and to the fact that the resistance to rotation offered by the valve stem 56 and the ring gear 48 is, at this time, slightly greater than the resistance offered by the ring gear 24, the ring gear 48 will remain stationary while the ring gear 24 turns a limited distance in a clockwise direction until the end walls 34a of the slots 34 abut the restraining arms 31 of the levers 29. Further movement of the ring gear 24 in a clockwise direction is then arrested by compression of the rubber disks 45 in response to a slight turning of the levers 29 about the pivot pins 30 so that the gear 24 becomes stationary while the gear 48 and the valve spindle 56 commence to turn in a valve closing direction. When the valve reaches its seat or encounters any obstruction which interferes with its further travel rotation of the shaft or stem 56 is arrested so that the gear 48 becomes stationary while the gear 24 is again caused to turn in a clockwise direction. This further turning of the gear 24 acts through the levers 29 to effect further compression of the rubber disks 45 and also serves to carry the trip member 74 into tripping engagement with the limit switch trigger 73 so that the limit switch 71 is actuated to deenergize the motor 11. In this operation the residual energy of the rotating masses is expended in compressing the rubber disks 45 so that the motor and gearing are brought to rest without shock following the opening of the motor circuit.

During the aforesaid turning of the gear 48 in a counter clockwise direction the thread 57 acts through the pinion 58 to lower the indicating rack 59 so that, when the valve is nearly seated, the pin 63 engages the contacts 64 to close a circuit containing a lamp or other electrical valve position indicator located at a remote point. This downward movement of the rack also carries the trip member 68 out of engagement with the trigger 70 of the limit switch 69.

To open the valve the motor 11 is energized to rotate the driving shaft 15 and the crank shaft 16 in a clockwise direction. Ring gear 24 thereupon rotates in a counter clockwise direction since the seating of the valve tends to hold the stem 56 and the ring gear 48 stationary. This rotation of gear 24 continues until it is arrested by engagement of the end wall 28a of the slot 28 with the pin 27. When this occurs the ring gear 24 becomes stationary and the ring gear 48 and the valve stem 56 commence to turn in a clockwise or valve opening direction. During this clockwise rotation of the ring gear 48 the thread 57 acts through the pinion 58 to raise the indicator rack 59. As the valve nears the limit of its opening movement the trip arm 68 on the rack 59 engages the trigger 70 and operates the limit switch 69 to deenergize the motor 11. At the same time the insulated pin 63 on the pinion 58 bridges the contacts 65 and closes a second signal circuit similar to that including the contacts 64.

When pin 27 is engaged by the end wall 28a of the slot 28 to arrest counter clockwise rotation of the ring gear 24 the impact is transmitted through the pinions 19 and 20 to the ring gear 48 and the valve stem 56 and assists in unseating the valve in case of jamming.

While the exact manner in which the motor 11, limit switches 69 and 71 and signal contacts 64 and 65 are electrically connected to serve their intended purpose forms no vital part of the present invention, I have shown in Fig. 12 a simple wiring diagram that has been followed in actual practice. In this diagram a three phase source of energy for operating the motor 11 is represented by the three mains designated 110, 111 and 112. The mains 110 and 111 are tapped by conductors 113 and 114 through which current is supplied to operate the magnetic reversing switch 115 and the signal lamps 116 and 117. In order to close the valve the main switch 118 is thrown so that the movable contact 119 bridges the stationary contacts 120 and 121. Current then flows from the main 110 to the main 111 via conductors 113, thermal overload trip-off switch 122, conductor 123, contacts 120, 119 and 121 of switch 118, conductor 124, coil 125 of magnetic reversing switch 115, conductor 126, limit switch 69 and conductor 114. The coil 125 of the magnetic reversing switch 115 is then energized to shift the movable contacts 127 into engagement with the co-operating stationary contacts 128 thereby connecting the motor leads 129, 130 and 131 to effect operation of the motor 11 in a valve closing direction. When the valve is nearly closed the pin 63 bridges the signal contacts 64 so that the signal lamp 116 is thus connected in a closed circuit with the conductors 113 and 114 via conductors 132 and 133, contacts 64 and conductor 134. When the valve is actually closed limit switch 69 is tripped as previously described and serves to open circuit the coil 125, whereupon the movable contacts 127 of the magnetic reversing switch are separated from the stationary contacts 128 to deenergize the motor 11. In order to open the valve switch 118 is thrown to the "opening" side so that the movable contact 119 bridges the stationary contacts 136 and 137. Current then flows from the main 110 to the main 111 via conductor 113, trip-off switch 122, conductor 123, contacts 136, 119 and 137 of switch 118, conductor 138, coil 139 of magnetic reversing switch 115, conductor 140, limit switch 71 and conductor 114. The coil 139 is thus energized to shift the movable contacts 147 of the magnetic reversing switch 115 into engagement with the co-operating stationary contacts 148 thereby connecting the motor leads 129, 130 and 131 to effect operation of the motor 11 in a valve opening direction. As soon as the motor starts to open the valve the pin 63 is shifted out of engagement with the signal contacts 64 to open circuit the signal lamp 116. Just before the valve reaches its fully opened position the pin 63 bridges the signal contacts 65 so that the signal lamp 117 is thus connected in circuit with the conductors 113 and 114 via conductors 132 and 149, signal contacts 65 and conductor 134. When the valve reaches its fully opened position the limit switch 71 is tripped as previously described and serves to open circuit the coil 139 whereupon the movable contacts 147 of the magnetic switch 115 are separated from the stationary contacts 148 to deenergize the motor.

Some of the principal advantages afforded by the construction described herein may be briefly summarized as follows: (1) The mounting of the motor in line with the valve stem and the arrangement of the gearing and its associated elements provides a compact symmetrical installation which occupies but little floor space and eliminates the unsightly appearance and scattered arrangement of the component elements of similar installations now in use. (2) The particular design of reduction gearing provided between the motor shaft and the valve stem enables a much higher ratio and efficiency of gear reduction to be provided for than is possible with the reduction gearing heretofore used in the same relation and it also reduced the power consumption by permitting successful use of a relatively small high speed motor. (3) The component elements of the installation are constructed and assembled to permit of economical manufacture and to facilitate erection and dismantling. (4) The full movement of the valve stem in the valve closing direction is positively effected by the motor without danger of shock since the residual energy of the rotating masses is stored up in the compression disks 45 after the valve stem reaches the end of its travel and (5) the operation of the limit switch 71 is not dependent upon actual seating of the valve but is also accomplished whenever the closing movement of the valve is interferred with so that the motor and the gearing are effectively guarded against shock in case the valve should encounter any obstruction which prevents its proper seating.

Whenever it is desired or necessary to operate the valve manually this is accomplished by turning a hand wheel 97 fixed to one end of a shaft 98. The shaft 98 is journalled in bearings 99 within the casing 14 and carries a helically toothed pinion 100 meshing with a similar helically toothed pinion 101 fixed to the drive shaft 15.

Having thus described my invention, what I claim is:—

1. The combination of a rotary spindle, a motor arranged with its shaft in axial alignment with said spindle, an internally toothed ring gear fixed to rotate with said spindle, a floating internally toothed ring gear of larger diameter spaced from the spindle gear but having the same center of revolution, a pinion of relatively small diameter meshing with said spindle gear, a pinion of larger diameter meshing with said floating gear and fixed to rotate with said smaller pinion about a common axis eccentric to the axis of the ring gears, means driven by the motor for causing said pinions to travel in a circular path concentric with the axis of the ring gears, said means being operable to change the direction of travel of said pinions, means for positively limiting rotational movement of the floating ring gear in one direction, yielding means for exerting gradually increasing resistance to rotational movement of the floating ring gear in the opposite direction, means functioning to automatically disrupt the motor circuit when the floating ring gear is rotated to a predetermined position in the last mentioned direction, and means controlled by the spindle gear for automatically disrupting the motor circuit following a predetermined rotation of the spindle gear in the opposite direction.

2. The combination of a rotary spindle, a motor arranged with its shaft in axial alignment with said spindle, an internally toothed ring gear fixed to said spindle, a floating internally toothed ring gear of larger diameter spaced from the spindle gear but having the same axis of rotation, a pinion meshing with said spindle gear, a second pinion of larger diameter than the first meshing with said floating gear and fixed to said first pinion to rotate therewith about a common axis eccentric to the common axis of the ring gears, means driven by the motor for causing said pinions to travel in a circular path concentric with the common axis of the ring gears, said means being operable to change the direction of travel of said pinions, means for positively limiting rotational movement of the floating ring gear in one direction and yielding means for opposing gradually increasing resistance to rotational movement of said gear in the opposite direction.

3. The combination of a rotary spindle, an internally toothed ring gear fixed to rotate with said spindle, a floating internally toothed ring gear of larger diameter spaced from the spindle gear but having the same axis of revolution, a pinion meshing with said spindle gear, a second pinion of greater diameter than the first meshing with said floating ring gear, said pinions being fixed to rotate in unison about a common axis eccentric to the common axis of the ring gears, means operable to impart travelling movement to said pinions in a circular path concentric with the common axis of the ring gears, said means being also operable to reverse the direction of travel of the pinions, means for positively limiting rotational movement of the floating gear in one direction and yielding means arranged to offer gradually increasing resistance to rotational movement of said floating gear in the opposite direction.

4. The combination of a rotary spindle, an internally toothed ring gear fixed to rotate with said spindle, a floating internally toothed ring gear of larger size spaced from the spindle gear but having the same axis of revolution, a pinion meshing with said spindle gear, a second larger pinion meshing with said floating ring gear, said pinions being fixed to rotate in unison about a common axis eccentric to the common axis of the ring gears, means operable to impart travelling movement to said pinions in a circular path concentric with the common axis of the ring gears, said means being also operable to reverse the direction of travel imparted to said pinions, and means associated with the floating ring gear for controlling rotational movement of said gear in either direction, said last mentioned means comprising a stationary stop member engageable with the floating ring gear to positively limit the rotational movement thereof in one direction, and a movable member yieldingly pressed into engagement with a portion of the floating ring gear and serving to offer gradual resistance to rotation of the floating gear in a direction opposite to that resisted by said stop member.

5. The combination of a rotary spindle, an internally toothed ring gear fixed to rotate with said spindle, a floating internally toothed ring gear spaced from the spindle gear but having the same axis of revolution, said ring gear being of different sizes, a pair of pinions of different sizes arranged with the larger pinion meshing with the larger ring gear and the smaller pinion meshing with the smaller ring gear, said pinions being mounted to rotate in unison about a common axis eccentric to the common axis of the ring gears and to have a travelling movement in a circular path concentric with the said axis of the ring gears, means for imparting travelling movement to said pinions in either direction, and restraining means associated with the floating ring gear for controlling rotation of said gear in response to operation of said pinions, said restraining means comprising a stop member engageable with the floating ring gear to limit rotational movement thereof in one direction and a series of movable levers engaging the floating ring gear and loaded to offer gradually increasing resistance to rotation of said gear in the opposite direction.

6. The combination of a driven shaft, a drive shaft aligned with the driven shaft and having a crank adapted to travel in a circular path concentric with the common axis of the shafts, a pair of pinions of different sizes mounted to rotate freely on said crank but fixed against relative movement, a pair of internally toothed ring gears of different sizes meshing with said pinions and arranged to have a common axis of rotation coinciding with the common axis of said shafts, a drive connection between the driven shaft and one of said ring gears and restraining means associated with the remaining ring gear for positively limiting rotational movement of said gear in one direction and for yieldingly opposing rotational movement of said gear in the opposite direction.

7. The combination of a pair of concentrically arranged pinions of different diameters mounted to rotate in unison about a common axis and to have a travelling movement in a circular path, a pair of internally toothed ring gears of different diameters meshing with said pinions, a drive member for imparting travelling movement to said pinions, a driven member, a drive connection between the driven member and one of said ring gears, means for positively limiting rotational movement of the last mentioned gear in one direction and yielding means arranged to offer gradually increasing resistance to rotational movement of said last mentioned gear in the opposite direction, said last mentioned means comprising a series of bell crank levers each having one arm engaged in a slot provided in said gear and yieldable means associated with the remaining arm of each lever so as to be compressed when the levers are moved through their engagement with said gear.

8. The combination of a pair of concentric pinions of different diameters mounted to rotate in unison about a common axis and to have a travelling movement in a circular path, a pair of internally toothed ring gears of different diameters meshing with said pinions, a driven member, a drive connection between the driven member and one of said ring gears, means for imparting travelling movement to said pinions including an electrically operated motor, means for positively limiting rotational movement of the remaining ring gear in one direction, yieldable restraining means for offering gradually increasing resistance to rotation of said last mentioned gear in the opposite direction, and means functioning to automatically disrupt the motor circuit when the last mentioned gear is rotated to a predetermined position against the resistance of said yieldable restraining means.

9. The combination of a pair of concentric pinions of different diameters mounted to rotate in unison about a common axis and to have a travelling movement in a circular path, a pair of internally toothed ring gears of different diameters meshing with said pinions, means including an electric motor for imparting travelling movement to said pinions in either direction, a driven member, a drive connection between the driven member and one of said ring gears, means for limiting rotation of the remaining ring gear in one direction, yieldable restraining means arranged to offer gradually increasing resistance to rotation of said last mentioned gear in the opposite direction, a limit switch, and means carried by the last mentioned ring gear for operating the limit switch to open the motor circuit when said ring gear is rotated to a predetermined position against the resistance of said yieldable restraining means.

10. The combination claimed in claim 9 in which the said yieldable restraining means serves to absorb the residual energy in the rotating parts and to gradually bring said parts to rest without substantial shock following opening of the motor circuit.

11. The combination of a pair of concentric pinions of different diameters mounted to rotate in unison about a common axis and to have a travelling movement in a circular path, a pair of internally toothed ring gears of different diameters meshing with said pinions, means including an electric motor for imparting travelling movement to said pinions in either direction, a driven member, a drive connection between the driven member and one of said ring gears, means for positively limiting rotation of the remaining ring gear in one direction, yieldable restraining means arranged to offer gradually increasing resistance to rotation of said last mentioned ring gear in the opposite direction, a limit switch, and means actuated by the ring gear connected to the driven member for operating said switch to open the motor circuit after a predetermined operation of the driven member.

12. The combination with a driven member and a driving motor therefor of an interposed gear connection including pinions of different diameters mounted to rotate in unison about a common axis and to have a travelling movement in a circular path, a pair of internally toothed ring gears of different diameters meshing with said pinions, means including said electric motor for imparting travelling movement to said pinions, a drive connection between the driven member and one of said ring gears, means for positively limiting rotation of the remaining ring gear in one direction, yieldable restraining means arranged to offer resistance to rotation of said last mentioned ring gear in the opposite direction and means for automatically opening the motor circuit when the motor torque exceeds a predetermined maximum value.

13. The combination with a driven member and a driving motor therefor of an interposed gear connection including pinions of different diameters mounted to rotate in unison about a common axis and to have a travelling movement in a circular path, a pair of internally toothed ring gears of different diameters meshing with said pinions, means, including said electric motor, for imparting travelling movement to said pinions, a drive connection between the driven member and one of said ring gears, means for limiting rotation of the remaining ring gear in one direction, yieldable restraining means arranged to yieldingly resist rotation of said last mentioned ring gear in the opposite direction, means controlled by the last mentioned ring gear for automatically opening the motor circuit after the driven member reaches its limit of movement in one direction or whenever the motor torque exceeds a predetermined maximum value, and means controlled by the other ring gear for opening the motor circuit approximately at the time the driven member reaches the limit of its movement in the reverse direction.

14. The combination as claimed in claim 12 in which the last mentioned means includes a pair of limit switches, one of which is arranged to be tripped to a circuit opening position by one of the ring gears when the latter is rotated to a predetermined position and the other of which is arranged to be tripped to a circuit opening position by the remaining ring gear when the latter is rotated to a predetermined position.

15. In a motor power unit assembly for operating valves and the like the combination of a casing, a spindle extending into the casing from one end thereof, a motor fastened to the opposite end of the casing with the motor shaft in line with said spindle, an internally toothed ring gear housed within the casing and fixed to rotate with said spindle, a floating internally toothed ring gear fixed to the spindle gear and having the same center of revolution, said floating gear being rotatably mounted in said casing, a pinion meshing with said spindle gear, a second pinion meshing with said floating gear, said pinions being mounted to rotate in unison about a common axis and to have a travelling movement in a circular path, means including said motor for imparting travelling movement to said pinions in either direction, rotation resisting means associated with the floating gear, said gear and pinion assembly serving to provide in conjunction with the rotation resisting means a torque coupling between the motor and the spindle which permits the latter to remain stationary when a predetermined torque limit is reached, a pair of limit switches arranged in said casing to be operated by the internally toothed ring gears for automatically opening the motor circuit as the spindle reaches the limit of its permissible movement in either direction, said floating ring gear being provided with a trip member adapted to operate one of said limit switches when the floating gear is rotated to a predetermined position during operation of the spindle in one direction, and means directly actuated by the spindle gear for operating the remaining limit switch when said spindle gear is rotated to a predetermined position during operation of the spindle in the opposite direction.

16. The combination claimed in claim 11 in which the last mentioned means includes a rotatable rack operating gear directly driven by the ring gear of the driven member, an indicator including a rack member meshing with said rack operating gear and a trip element carried by the rack member adapted to engage and operate the limit switch when the ring gear of the driven member is rotated to a predetermined position during operation of said driven member in one direction.

17. The combination claimed in claim 8 including switch means operable by the last mentioned gear to close one or the other of two signal circuits as the driven member reaches the limit of its permissible movement in either direction.

MARTIN J. BERLYN.